Feb. 17, 1931.   H. D. SEGER   1,793,419
TOWING MEANS
Filed Feb. 20, 1930
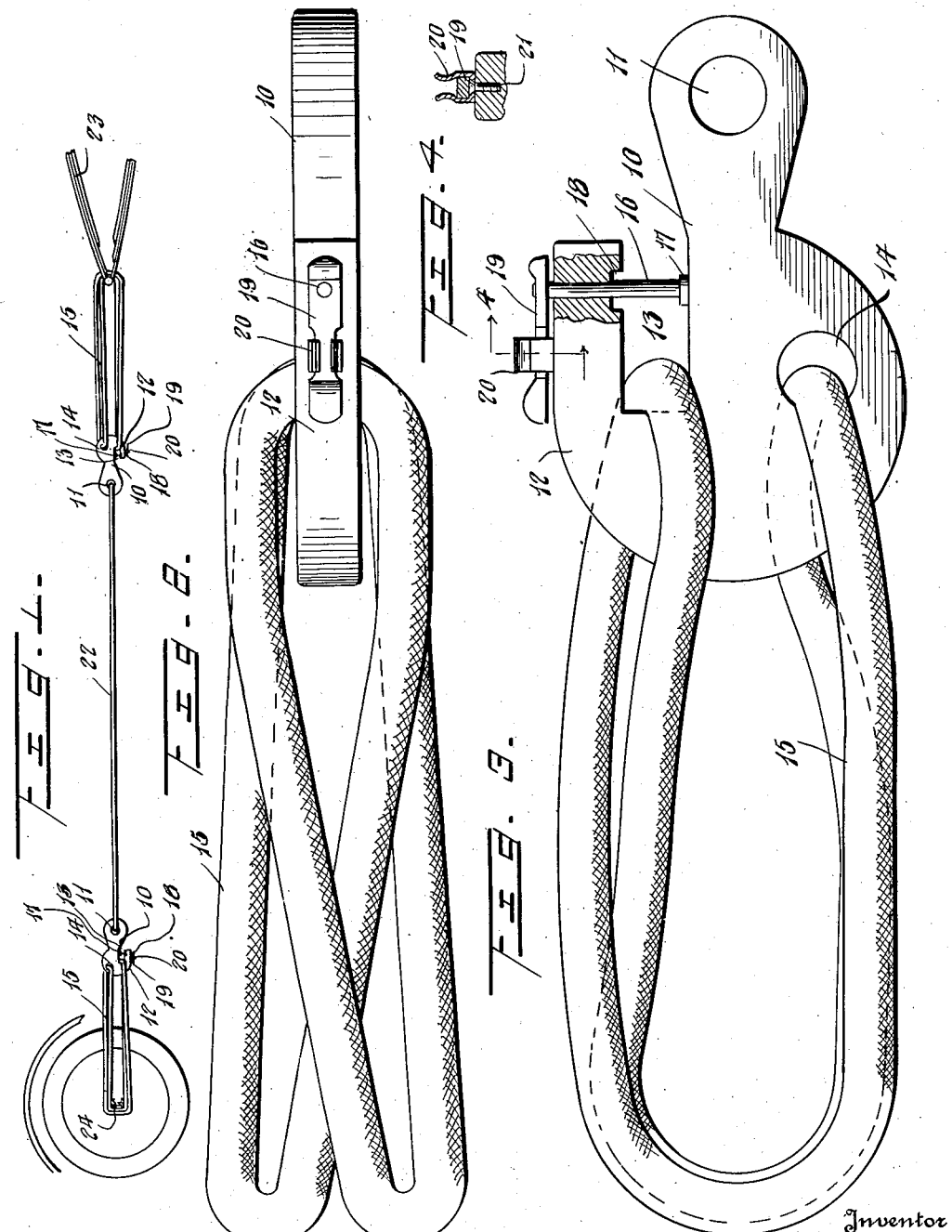
Inventor
H. D. Seger.
By [signature]
Attorney Patented Feb. 17, 1931

1,793,419

UNITED STATES PATENT OFFICE

HERBERT D. SEGER, OF DONORA, PENNSYLVANIA

TOWING MEANS

Application filed February 20, 1930. Serial No. 430,033.

This invention relates to a towing means particularly for use where one automobile is used to tow a disabled one.

It is aimed to provide a novel construction of hook, means connecting them together and means whereby the same may be connected one to a draft vehicle and the other to the trailing vehicle.

Another object is to provide a novel construction of hook used in connection therewith.

Additional objects and advantages will become apparent from a consideration of the description following taken in connection with accompanying drawings illustrating an operative embodiment.

In said drawings:—

Figure 1 is a view illustrating the invention as attached to a spring of a draft vehicle and to the axle of a trailing vehicle, Figure 2 is a plan view of one of the hooks and its attaching cable, Figure 3 is a side elevation of the parts of Figure 2, partly broken away to disclose details, and Figure 4 is a cross sectional view taken on the line 4—4 of Figure 3.

Referring specifically to the drawings, and first to the devices of Figures 2 and 3, the same comprises a hook block 10 having an attaching eye at 11, a hook at 12, whose opening is shown at 13, and also having an eye at 14. An endless flexible cable or similar element, providing a flexible ring 15, is roved in the eye 14 and is adapted for attachment to and detachment from the hook 12, a portion thereof occupying the opening 13 to provide a double loop as shown in the drawings. To secure the cable 15 in the opening 13 against danger of accidental detachment, a guard rod 16 is employed which is transversely slidably mounted by the hook 12. Such rod 16 has a head 17 which limits its retraction and which is received within a recess 18 of the hook. To facilitate operation of the guard rod 16, it has an arm 19 fastened thereto and located on the outside of the hook. Such arm is adapted to be secured in slot-closing position by engagement with a resilient clasp 20 screwed or otherwise fastened as at 21 to the hook 12, it being understood that the clasp 20 is of U-shape and of resilient metal and that the arm 19 moves into and out of the clasp.

In use, usually two of the devices shown in Figures 2 and 3 are used and they are connected by a cable 22 which is fastened in the eyes 11 of the respective hook blocks 10.

With reference to Figure 1, one of the bolster springs of the drawing vehicle is shown at 23 and the cable 15 of the adjacent device is fastened thereto. The cable 15 of the other device is secured around the front axle 24, or other parts, of the trailing or disabled vehicle.

The device is adapted to be readily folded into compact form and occupies minimum space when not in use.

Various changes may be resorted to provided they fall within the spirit and scope of the invention.

I claim as my invention:—

1. A device of the class described comprising a block having a hook, a cable attached to the block and engageable with the hook to form a loop, and a guard rod adapted to close the entrance to said hook, an arm on said guard rod, and means to secure the arm against retraction.

2. A device of the class described comprising a block having a hook, a cable attached to the block and engageable with the hook to form a loop, a guard rod adapted to close the entrance to said hook, an arm on said guard rod, means to secure the arm against retraction comprising a resilient clasp located on the outer side of the hook.

3. A device of the class described comprising a hook, a guard rod slidably mounted thereon adapted to close the entrance to the hook, an arm carried by said rod, and a resilient clasp on the hook engageable by the rod to maintain it against accidental retraction.

In testimony whereof I affix my signature.

HERBERT D. SEGER.